United States Patent [19]

Maliczyszyn et al.

[11] Patent Number: 6,037,466
[45] Date of Patent: Mar. 14, 2000

[54] METHOD FOR PREPARING HYDROPHOBIC STARCH DERIVATIVES

[75] Inventors: Walter Maliczyszyn, Somerville; Jeffrey G. Atkinson, Neshanic Station; Maria Tolchinsky, Monmouth Junction, all of N.J.

[73] Assignee: National Starch and Chemical Investment Holding Corporation, Wilmington, Del.

[21] Appl. No.: 09/224,458

[22] Filed: Dec. 31, 1998

[51] Int. Cl.$^7$ ..................... C08B 31/00
[52] U.S. Cl. ............ 536/102; 536/45; 536/55.3; 536/105; 536/108; 536/110; 536/111; 536/124; 536/127; 536/128
[58] Field of Search ............... 536/102, 108, 536/110, 111, 105, 124, 127, 128, 45, 55.3

[56] References Cited

U.S. PATENT DOCUMENTS

| | | | |
|---|---|---|---|
| 2,461,139 | 2/1949 | Caldwell | 260/234 |
| 2,661,349 | 12/1953 | Caldwell et al. | 260/224 |
| 5,672,699 | 9/1997 | Billmers et al. | 563/102 |

OTHER PUBLICATIONS

"Starch: Chemistry and Technology", Second Edition, edited by R. L. Whistler et al., 1988, pp. 341–343.

"Modified Starches: Properties and Uses", edited by O. Wurzburg, 1986, Chapter 9, pp. 131–147.

*Primary Examiner*—James O. Wilson
*Attorney, Agent, or Firm*—Karen G. Kaiser

[57] ABSTRACT

A method for preparing hydrophobic starch derivatives wherein starch and an anhydride are reacted in a slurry with the anhydride reagent being added to the slurry in pre-emulsified form to provide a significantly faster and more efficient reaction.

16 Claims, 2 Drawing Sheets

METHOD FOR PREPARING HYDROPHOBIC STARCH DERIVATIVES

BACKGROUND OF THE INVENTION

This invention relates to a method for preparing starch derivatives by reacting starch and an anhydride or substituted dicarboxylic acid anhydride wherein the anhydride reagent is added to the starch slurry in pre-emulsified form and provides a faster, more efficient reaction.

The preparation of starch derivatives and especially hydrophobic derivatives such as starch alkyl or alkenyl succinates is well known and has been carried out for many years. U.S. Pat. No. 2,661,349 issued on Dec. 1, 1953 to C. Caldwell and O. Wurzburg describes such starch derivatives and the aqueous method in which they are prepared using a standard esterification reaction where the reagent and starch suspended in water are mixed under alkaline conditions. Other methods for preparing the starch derivatives are disclosed in the '349 patent including an organic suspension or dispersion method and a so called dry method using starch in the commercially dry form, i.e., starch having a moisture content of approximately 5 to 20%. The starch derivatives and method of preparation are further described in "Starch: Chemistry and Technology", Second Edition, edited by R. L. Whistler et al., 1988, pp. 341–343 and "Modified Starches: Properties and Uses", edited by O. Wurzburg, 1986, Chapter 9, pp.131–147.

The reaction of hydrophobic reagents such as octenyl succinic anhydride (OSA) in aqueous systems is limited by the solubility of such reagents, moderate reaction efficiencies and long reaction times. Reagents with longer side chains, i.e., dodecenyl, hexadecenyl, etc., have even lower solubility in water and are much harder to react under the known conditions and in fact in some cases will not react at all.

Recent U.S. Pat. No. 5,672,699 issued on Sep. 30, 1997 to R. Billmers et al. discloses a method for preparing hydrophobic starch derivatives having improved reaction efficiencies wherein the starch and anhydride reagent are predispersed or intimately contacted at low pH before being brought to alkaline reaction conditions.

While the methods described above are useful in providing hydrophobic starch derivatives, there still is the need for a method which will provide reduced reaction time and improved reaction efficiency.

SUMMARY OF THE INVENTION

Now in accordance with this invention, an improved method for preparing hydrophobic starch derivatives is provided wherein the anhydride reagent in pre-emulsified form is added to a starch slurry and then the slurry is brought to reaction conditions. This method involving a pre-emulsified anhydride reagent results in significantly reduced reaction time and improved reaction efficiency.

More particularly, this invention involves a method of preparing a hydrophobic starch derivative comprising reacting starch with an organic acid anhydride in an aqueous system wherein:

a) starch is slurried in water at a pH of from about 2 to 11;

b) an aqueous emulsion of an organic acid anhydride reagent having one of the following formulas is added to the slurry:

i) 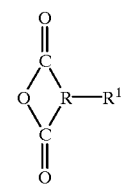

ii) 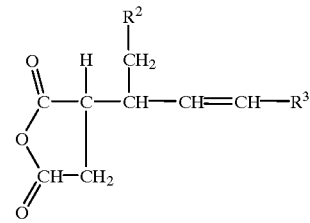

iii) 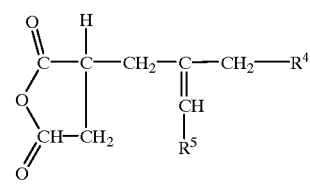

iv) 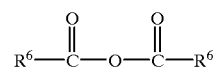

where R is a dimethylene or trimethylene group or the corresponding unsaturated group, e.g., ethenyl; $R^1$ is a linear, branched or cyclic alkyl, alkenyl, aralkyl or aralkenyl group having 2 to 23 carbon atoms; $R^2$ and $R^3$ are independently an alkyl group having 4 to 23 carbon atoms; $R^4$ and $R^5$ are independently an alkyl group having 5 to 23 carbon atoms; and $R^6$ is an independently linear, branched or cyclic alkyl, alkenyl, aralkyl or aralkenyl group having 2 to 23 carbon atoms; and c) adding alkaline material to adjust the pH to 7.0 or greater and adding further alkaline material to maintain the pH at that level until the reaction is complete.

DETAILED DESCRIPTION OF THE INVENTION

Figure 1:
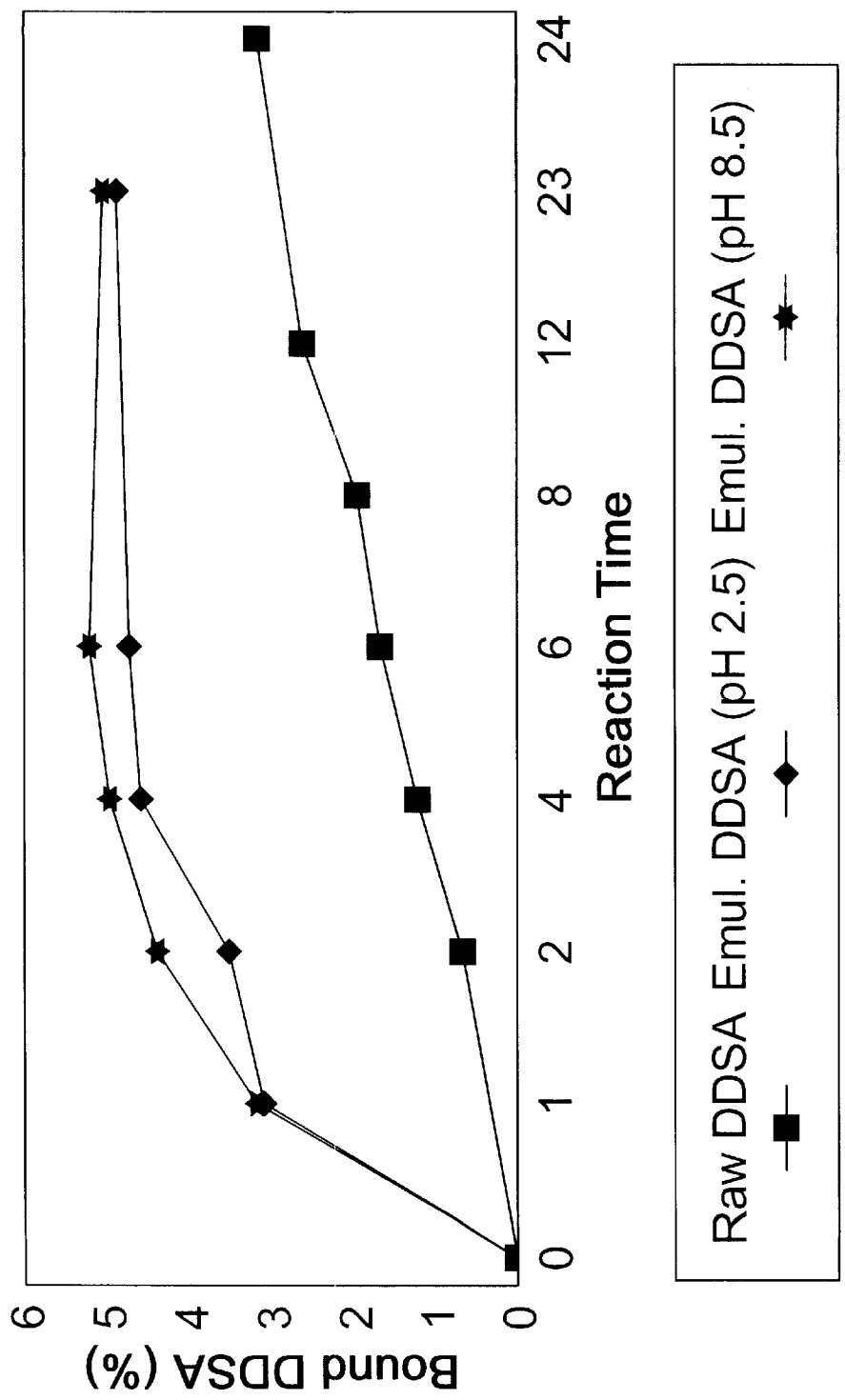
FIG. 1 is a graph of bound DDSA (dodecenyl succinic anhydride) percent (%) vs. reaction time.

The method of preparing hydrophobic starch derivatives in accordance with this invention involves adding a pre-emulsified anhydride reagent to a starch slurry and then bringing the mixture to alkaline reaction conditions. The starch derivatives prepared by this method will have the following general formula when an anhydride of formula (i) is used:

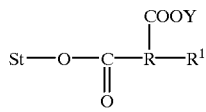

where St is the starch base material, R is a dimethylene or trimethylene group or the corresponding unsaturated group, $R^1$ is a linear, branched or cyclic alkyl, alkenyl, aralkyl or aralkenyl group having 2 to 23 carbon atoms, and Y is H, alkali metal, alkaline earth metal or ammonium. Starch derivatives having similar formulas are prepared when using anhydride reagents having formulas (ii) and (iii). In such case $R^1$ is replaced with the following respective groups:

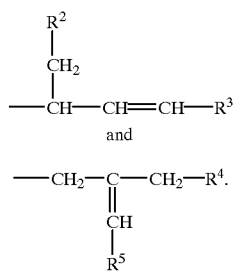

When starch derivatives are prepared using anhydride reagents having formula (iv), the derivative will have the following general formula:

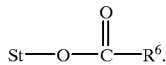

The starch derivative of this latter type, may have one or more $R^6$ groups and they may be different groups thus providing a mixed starch ester.

The base starch material used herein may be any of several starches, native or converted or derivatized. Such starches include those derived from any plant source including, e.g., corn, potato, wheat, rice, tapioca, waxy maize, sago, sorghum and high amylose starch such as high amylose corn, i.e., starch having at least 40% and more particularly at least 65% amylose content by weight, etc. Starch flours may also be used. Also included, are the conversion products derived from any of the former bases such as, for example, dextrins prepared by hydrolytic action of acid and/or heat; fluidity or thin boiling starches prepared by enzyme conversion or mild acid hydrolysis; oxidized starches prepared by treatment with oxidants such as sodium hypochlorite; and derivatized starches such as cationic, anionic, amphoteric, non-ionic and crosslinked.

The organic acid anhydride reagent material used in the method of this invention will have one of the formulas (i), (ii), (iii) and/or (iv) noted above. The anhydride of formula (i) are as shown as follows:

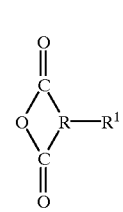

where R represents a dimethylene or trimethylene group or the corresponding unsaturated gorup, e.g., ethenyl; and $R^1$ is a hydrocarbon group having 2 to 23 carbon atoms, more particularly 5 to 18, and preferably 8 to 12 carbon atoms. The hydrocarbon or hydrophobic substituent group $R^1$ may be a linear, branched or cyclic alkyl, alkenyl, aralkyl or aralkenyl with alkyl and alkenyl being preferred. $R^1$ may be joined to the anhydride moiety R through a carbon to carbon bond (as in alkenyl succinic anhydride) or through two carbon to carbon bonds (as in the adduct of maleic anhydride with methyl pentadiene, or as in the cyclo-paraffinic cyclo-dicarboxylic acid anhydrides such as cyclo hexane 1,2-dicarboxylic acid anhydride), or may be linked through an ether or ester linkage (as in octyloxy succinic anhydride or in capryloxy succinic anhydride).

Specific examples of the anhydrides of formula (i) include isooctadecenyl succinic acid anhydride, n- or iso-hexadecenyl succinic acid anhydride, dodecenyl succinic acid anhydride, dodecyl succininc acid anhydride, decenyl succinic acid anhydride, octenyl succinic acid anhydride, and triisobutenyl succinic acid anhydride. The substituted cyclic dicarboxylic acid anhydrides of structure (i) are further described in U.S. Pat. No. 3,102,064 issued on Aug. 27, 1963 to O. Wurzburg et al. which is hereby incorporated herein by reference.

The anhydrides of formula (ii) have the following structure:

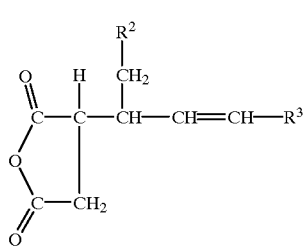

where $R^2$ and $R^3$ are independently an alkyl group of 4 to 23 carbon atoms and more particularly 5 to 20 carbon atoms.

Specific examples of anhydrides within formula (ii) include (1-octyl-2decenyl)-succinic acid anhydride and (1-hexyl-2-octenyl)-succinic acid anhydride. The anhydrides of formula (ii) are further described in U.S. Pat. No. 3,821,069 issued Jun. 28, 1974 to O. Wurzburg and which is hereby incorporated herein by reference.

The anhydrides of formula (iii) have the following structure:

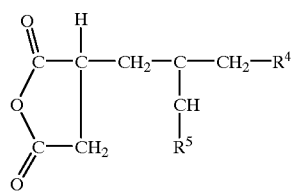

where $R^4$ and $R^5$ are independently an alkyl group having 5 to 23 carbon atoms and more particularly 5 to 20 carbon atoms.

Specific examples of anhydrides of formula (iii) include non-polymeric sizes prepared by the reaction of maleic acid anhydride with vinylidene olefins such as 2-n-hexyl-1-octene, 2-n-octyl-1-dodecene, 2-n-octyl-1-decene, 2-ndodecyl-1-octene, 2-n-octyl-1-octene, 2-n-octyl-1-nonene, 2-n-hexyl-decene and 2-n-heptyl-1-octene. The anhydrides of structure (iii) are further described in U.S. Pat. No. 3,968,005 issued Jul. 6, 1976 to O. Wurzburg and which is hereby incorporated herein by reference.

The anhydrides of formula (iv) will have independent $R^6$ hydrocarbon groups of 2 to 23 carbon atoms and more particularly 4 to 23 carbon atoms.

The essential step in the method of this invention involves pre-emulsifying the anhydride reagent before it is added to the starch slurry and proceeding with the reaction. The pre-emulsification of the anhydride generally involves formation of an aqueous emulsion with sufficient water added to provide the emulsion containing the desired amount of anhydride. Thus, the concentration of the anhydride used will vary depending on the articular anhydride reagent and the amount of anhydride to be reacted with starch. More particularly, the aqueous emulsion will contain from about 1 to 60% by weight and preferably about 15 to 50% by weight of anhydride. To aid in the formation of the emulsion, surfactants and emulsifying aids can generally be used. The useful surfactants and emulsifying aids include a nonionic species such as fatty acid alkoxylates, polyethylene glycol derivatives (e.g., alkyl phenol alkoxylates) and carboxylic esters. Anionic surfactants such as sulfosuccinates and phosphate esters; cationic surfactants such as quaternary ammonium compounds and amphoteric surfactants such as propionates and betaines containing both quaternary nitrogen functional groups and carboxylic functional groups may also be used to effectively prepare the emulsion. The emulsion can be prepared in different particle sizes with a particle size of less than about $2\mu$ being especially useful for this application. While the amount of emulsifier can vary depending on the particular materials and conditions, typically from about 0.01 to 25% by weight of emulsifier, based on the weight of anhydride reagent, will be used.

The anhydride emulsion can be added to the starch slurry while at any pH and more particularly at a pH of from about 2 to 11, preferably from 7 to 11. Reaction of the starch and anhydride reagent is initiated by adjusting the pH to the alkaline side or greater than 7.0 with the addition of an alkali material if necessary. After the system reaches the desired pH and the reaction is begun, the reaction is continued by adding enough alkali to maintain this pH level. Suitable pH range for carrying out the reaction is from about 7 to 11, preferably from about 7 to 9.

Any alkali material may be used as the alkali reagent or alkaline medium in the method of this invention. Particularly useful alkali materials are the alkali metal hydroxides and alkaline earth metal hydroxides or the Group IA or IIA hydroxides, oxides, carbonates or other salts. Illustrative alkali materials are sodium hydroxide, potassium hydroxide, calcium hydroxide, ammonium hydroxide, magnesium hydroxide, sodium carbonate and trisodium phosphate. Preferred alkalis are the alkali metal hydroxides and most preferred is sodium hydroxide.

The reaction can be carried out at room temperature, typically 22.5° C., although a range of temperatures can be used depending on the reagents used. More particularly, a temperature range of about 10 to 50° C. and preferably about 20 to 40° C. may be used.

The amount of organic acid anhydride that is used in the reaction will depend on the particular anhydride reagent and starch used and will also depend on the properties desired in the final product as well as the nature of the reaction. Amounts of the anhydride can vary from about 1 to 100% by weight based on the weight of starch, more particularly from about 2 to 60% and preferably from about 3 to 10%.

The starch is initially slurried in water at between 5 and 50% solids, more preferably between 25 to 40%. If desired, the pH can be adjusted to less than 7.0 by addition of any inorganic or mineral acid, typically hydrochloric or sulfuric acid. After the reaction, the product can be recovered by standard techniques such as filtration and centrifugation.

The advantages in carrying out the method of this invention include the preparation of hydrophobic starch derivatives with high degrees of substitution in reactions involving reduced reaction time and improved reaction efficiency.

The following examples will further illustrate the embodiments of this invention. In these examples all parts are given by weight and all temperatures in degrees Celsius unless otherwise noted.

EXAMPLE I

An emulsion of dodecenyl succinic anhydride (DDSA) was prepared by mixing 28.5 parts of DDSA and 1.5 parts of nonyl phenol ethoxylate (Surfonic N-95) surfactant in a Waring blender (2 minutes, high speed, 25° C.) with 70 parts of water. A stable emulsion with average particle size of less than $2\mu$ was obtained.

A slurry of 2000 g of waxy maize starch and 3000 g of water was prepared and the pH adjusted to 2.5. The emulsion of DDSA prepared as described above was added to the starch slurry in sufficient amount to provide 139 g of DDSA. The pH of the mixture was brought to 8.5 with the addition of 3% NaOH. The pH was maintained at this level with further addition of NaOH until the reaction was complete (pH essentially constant without addition of NaOH). The slurry pH was adjusted to about 5.5 with dilute HCl acid and the product was filtered and recovered. The bound reagent percent based on the weight of starch was 4.73 and the reaction time was 6 hours.

Bound DDSA (dodecenyl succinic reagent) was determined using the following alkali titration procedure. Five grams of derivatized starch were weighed into a 50 ml beaker. Then 10 ml of ethanol was added to the beaker and allowed to stir. Twenty-five (25) ml of 0.1N hydrochloric acid were added and the entire solution was allowed to stir for 30 minutes. The slurry was filtered and the wet cake was washed with deionized water. The wet cake was quantitatively transferred to a 600 ml beaker, 100 ml of purified water were added, and then 200 ml of boiling purified water were added. The solution was placed into a boiling water bath and cooked for 30 minutes. Immediately after the solution was cooked, 6 to 10 drops of a 1% thymolphthalein indicator were added and the solution was immediately titrated with 0.1N sodium hydroxide to the thymolphthalein endpoiint. The bound DDSA was calculated as follows:

$$\text{Bound } DDSA(\%) = \frac{(\text{ml } 0.1N \text{ NaOH}) \times (\text{Normality of NaOH}) \times 0.266}{\text{anhydrous sample weight (grams)}}$$

EXAMPLE II

A similar starch derivative was prepared using an emulsion of DDSA and waxy maize starch and the same procedure as Example I with the pH of the starch mixture adjusted to 8.5 prior to addition of the emulsion. The resulting product had a bound reagent percent based on the weight of starch of 5.21 in a 6 hour reaction time.

EXAMPLE III

For comparison purposes, a control was run using the same procedure followed in Examples I and II but with raw dodecenyl succinic anhydride (DDSA) reagent (i.e., not emulsified) added to the waxy maize starch. The results for the control procedure as well as those for Examples I and II are given below in Table 1. Caustic consumed was measured by placing a tared beaker containing caustic solution onto a weighing scale, recording the initial weight, and then recording weight at specific time intervals. The initial weight minus the weight at a specific time interval is the consumed caustic at that time interval.

TABLE 1

| Reaction Time (hr) | pH | Caustic Consumed (g) | Bound DDSA (%) |
|---|---|---|---|
| Control (raw DDSA) | | | |
| 2 | | 111 | 0.67 |
| 4 | | 200 | 1.22 |
| 6 | | 276 | 1.67 |
| 8 | | 346 | 1.95 |
| 12 | | 482 | 2.62 |
| 24 | | 696 | 3.17 |
| 31 | | 729 | 2.98 |
| Example I (emulsified DDSA, pH 2.5) | | | |
| 0 | — | — | 0 |
| 1 | 8.44 | 466 | 3.09 |
| 2 | 8.43 | 677 | 3.52 |
| 4 | 8.4 | 902 | 4.59 |
| 6 | 8.8 | 976 | 4.73 |
| 23 | 8.49 | 982 | 4.88 |
| Example II (emulsified DDSA, pH 8.5) | | | |
| 0 | — | — | 0 |
| 1 | 8.43 | 527 | 3.18 |
| 2 | 8.46 | 745 | 4.39 |
| 4 | 8.45 | 916 | 4.97 |
| 6 | 8.49 | 949 | 5.21 |
| 23 | 8.49 | 972 | 5.05 |

Figure 2:
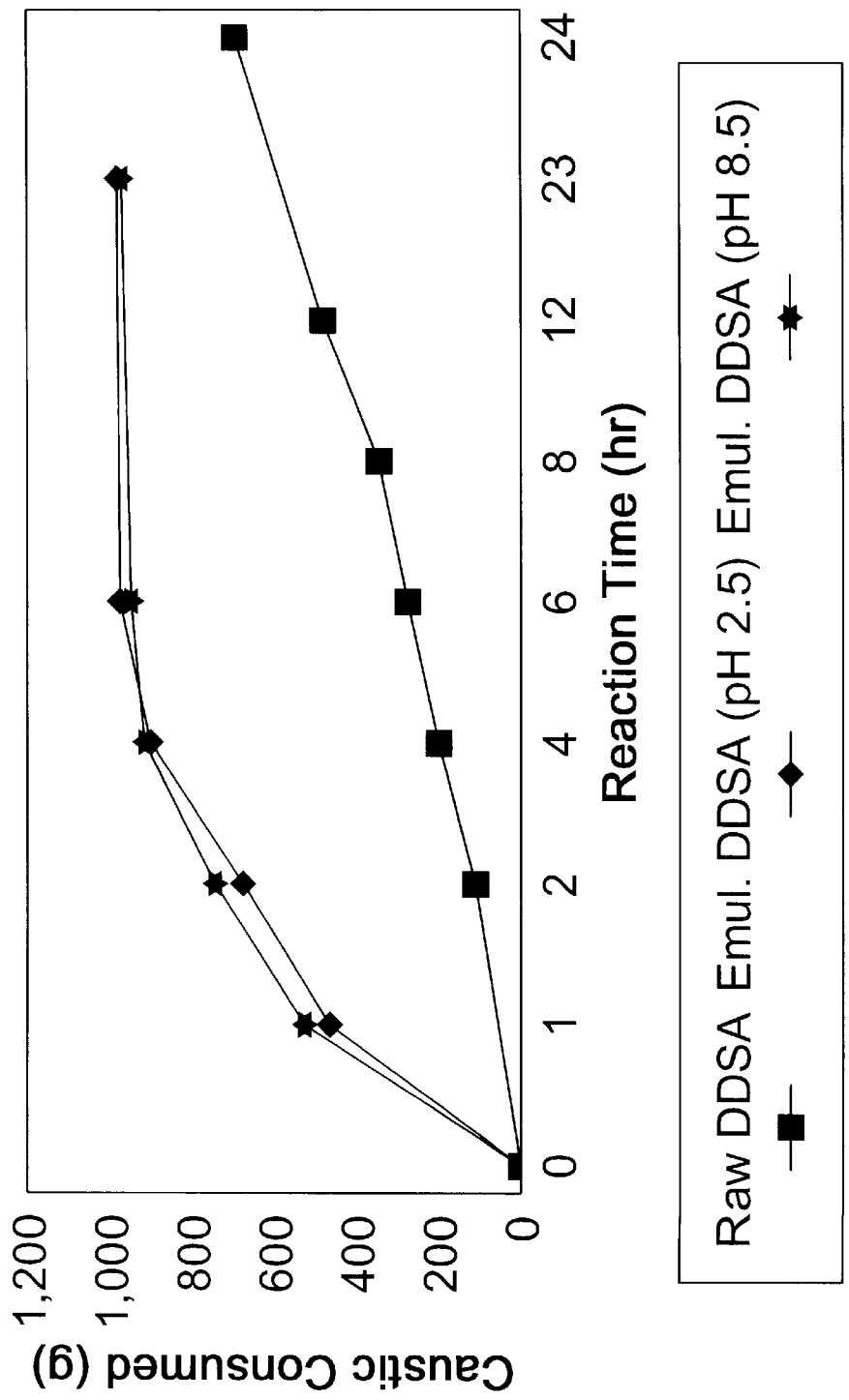
FIG. 2 is a graph of caustic consumption vs. reaction time.

The results described in Table 1 show the decreased reaction time and increased reaction efficiency (high bound DDSA %) when using the procedure of Examples I and II with pre-emulsified anhydride reagent as compared to the control where the raw non-emulsifed DDSA reagent was used. The results are more clearly depicted in graphic form in FIG. 1 which shows the bound DDSA percent (%) vs. reaction time and in FIG. 2 which shows caustic consumption vs. reaction time.

What is claimed is:

1. A method of preparing a hydrophobic starch derivative comprising reacting starch with an organic acid anhydride in an aqueous system wherein:

a) starch is slurried in water at a pH of from about 2 to 11;
b) an organic acid anhydride having one of the following formulas pre-emulsified and then is added to the slurry:

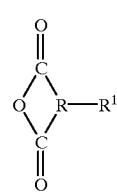

(i)

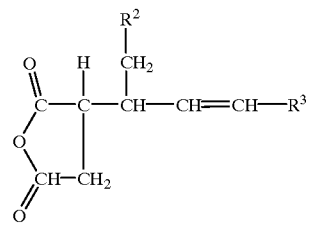

(ii)

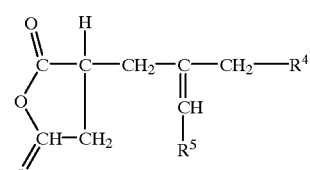

(iii)

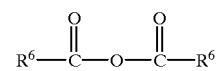

(iv)

where R is a dimethylene or trimethylene group or the corresponding unsaturated group, $R^1$ is a linear, branched or cyclic alkyl, alkenyl, aralkyl or aralkenyl group having 2 to 23 carbon atoms, $R^2$ and $R^3$ are independently an alkyl group having 4 to 23 carbon atoms, $R^4$ and $R^5$ are independently an alkyl group having 5 to 23 carbon atoms, and $R^6$ are independently a linear, branched or cyclic alkyl, alkenyl, aralkyl or aralkenyl group having 2 to 23 carbon atoms, and c) adding alkali material to adjust the pH at 7.0 or greater to initiate the reaction and adding further alkali material to maintain the pH at this level until the reaction is complete.

2. The method of claim 1 where $R^1$ is an alkyl, or alkenyl group having 5 to 18 carbon atoms.

3. The method of claim 1 wherein the pH in step c) is from about 7 to 11.

4. The method of claim 1 wherein the alkali material is an alkali metal hydroxide.

5. The method of claim 1 wherein R is a dimethylene group.

6. The method of claim 1 wherein the starch slurry of part a) is at a pH of from 7 toms 11.

7. The method of claim 1 wherein the pH in step c) is from about 7 to 9.

8. The method of claim 1 wherein the anhydride of formula (i) is used.

9. The method of claim 8 wherein $R^1$ is an alkyl or alkenyl group of from 5 to 18 carbon atoms.

10. The method of claim 9 wherein the pH of step (c) is from about 7 to 9.

11. The method of claim 10 wherein the alkali material is an alkali metal hydroxide.

12. The method of claim 11 wherein the starch slurry of part a) is at a pH of from about 7 to 11.

13. The method of claim 11 wherein R is a dimethylene group.

14. The method of claim 13 where $R^1$ is an alkyl or alkenyl group of 8 to 12 carbon atoms.

15. The method of claim 14 where the alkali material is sodium hydroxide.

16. The method of claim 15 where the anhydride is dodecenyl succinic anhydride.

* * * * *